United States Patent [19]

Myojo et al.

[11] Patent Number: 5,155,245
[45] Date of Patent: Oct. 13, 1992

[54] PROCESS FOR REFINING LANOLINS

[75] Inventors: Katsunori Myojo, Kakogawa; Takeshi Osada, Suita; Mikinobu Sato, Akashi; Shiro Yoshikawa, Ashiya, all of Japan

[73] Assignee: Yoshikawa Oil & Fat Co., Ltd., Osaka, Japan

[21] Appl. No.: 460,333

[22] PCT Filed: Jun. 5, 1989

[86] PCT No.: PCT/JP89/00566
§ 371 Date: May 10, 1990
§ 102(e) Date: May 10, 1990

[87] PCT Pub. No.: WO90/02789
PCT Pub. Date: Mar. 22, 1990

[30] Foreign Application Priority Data

Sep. 14, 1988 [JP] Japan ................. 63-230269
Apr. 20, 1989 [WO] PCT Int'l Appl. ... PCT/JP89/00427

[51] Int. Cl.$^5$ ............................................... C09F 5/10
[52] U.S. Cl. ................................ 552/545; 554/193; 554/141
[58] Field of Search .................. 260/428.5, 427, 410.6, 260/428, 420

[56] References Cited

U.S. PATENT DOCUMENTS 3,853,930 12/1974 Richey ..................... 260/428.5

OTHER PUBLICATIONS

Diserens, Journal of Chromatography, vol. 156, #1, 1978, pp. 63–70.
Buschuyuschii et al., Chemical Abstracts, vol. 72, No. 10, 1969.
Bushuyushchii et al., Chemical Abstracts, vol. 72, No. 10, p. 109, 1970.

Primary Examiner—Jose G. Dees
Assistant Examiner—Deborah D. Carr
Attorney, Agent, or Firm—Armstrong & Kubovcik

[57] ABSTRACT

The present invention provides a process for refining a material lanolin containing pesticides, the process being characterized in that the pesticide remaining in the material is removed by subjecting to at least one step selected from among (1) the step of treating the material in a molten state or in an organic solvent in the presence of a hydrogenation catalyst under the conditions of a temperature of 60° to 210° C., a hydrogen pressure or at least 1 atm. and hydrogen consumption of 0.001 to 0.05 wt. % based on the material lanolin, (2) distilling the material in a vacuum at an absolute pressure of $10 \times 10^{-3}$ to $500 \times 10^{-3}$ mmHg at a temperature of 150° to 280° C., and (3) the step of causing the material to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms.

9 Claims, No Drawings

PROCESS FOR REFINING LANOLINS

TECHNICAL FIELD

The present invention relates to a process for refining lanolins, and more particularly to a process for almost completely removing traces of pesticides from lanolin, wool grease, derivative thereof or the like to obtain highly refined lanolin or the like which is usable as a base material for cosmetics, pharmaceuticals or the like with high safety.

BACKGROUND ART

The term "lanolin" refers collectively to refined products ranging from about 36° to about 44° C. in melting point and obtained from wool grease (WG) which is the lipid secretion of the sebaceous glands of sheep by subjecting the grease to an acid treatment and deacidifying, decolorizing, deodorizing and like processes. Lanolin has emollient, self-emulsifying and like characteristics, closely resembles human sebum, has been dermatologically found to be of safety and has long been in prevalent use as a base material for application to the skin in the field of cosmetics, pharmaceuticals, etc. Lanolin further has a very complex composition consisting primarily of mixtures of esters of almost 100 kinds of lanolin fatty acids and more than 70 kinds of lanolin alcohols and containing up to about ten-odd % of free alcohols with sterols, several % of carbohydrates and traces of free fatty acids. It is said to be a unique lipid among other natural lipids. The lanolin fatty acids constituting lanolin (esters) include straight-chain acids in a small amount of up to about 10% of the whole amount and iso, ante-iso and like branched-chain fatty acids in an amount of about ⅔ of the whole, the remainder of about ⅓ being hydroxy fatty acids. These fatty acids range widely from 9 to 34 in the number of carbon atoms and have an average molecular weight of about 320. Further alicyclic alcohols such as cholesterol and triterpene alcohols which are predominantly lanosterol account for about 70% of all the lanolin alcohols, the balance being aliphatic alcohols chiefly including straight-chain, iso and ante-iso alcohols and further including about 5 to about 8% of diols. These alcohols range from 14 to 33 in the number of carbon atoms and about 370 in average molecular weight.

On the other hand, with the development of agricultural chemicals such as pesticides and a rapid increase in the amount of demand therefor in recent years, the raw material for lanolin, i.e., WG, contains residues of such pesticides, which are left almost unremoved by the process presently practiced for refining WG. Thus, pesticide residues are found also in the product lanolin.

The pesticide residues present in lanolin are a wide variety of pesticides which are in common use and which are divided generally into the following organic chloride compounds and organic phosphorus compounds.

Organic chlorine compounds

Hexachlorobenzene (HCB), $\alpha,\beta,\delta$-hexachlorocyclohexane ($\alpha,\beta,\delta$-BHC), $\gamma$-hexachlorocyclohexane ($\gamma$-BHC), aldrin (ALD), dieldrin (DLD), endrin (END), o,p-dichlorodiphenyltrichloroethane (o,p-DDT), p,p'-dichlorodiphenyltrichloroethane (p,p'-DDT), p,p'-dichlorodiphenyldichloroethylene (DDE), heptachlor (HC), heptachlor epoxide (HCE), $\gamma$-chlordane ($\gamma$-CD), etc.

Organic phosphorus compounds

Diazinon (DZN), bromophosethyl (BPE), dichlofenthion (DCP), $\alpha$-chlorfenvinphos ($\alpha$-CVP), $\beta$-chlorfenvinphos ($\beta$-CVP), etc.

Each of the pesticides will hereinafter be referred to by the abbreviation.

Although the amounts of pesticide residues in lanolin are dependent on the WG used as the material for lanolin, especially on the history of the greasy wool from which the WG is recovered, the amounts determined by analyzing samples available were in the following ranges.

| Pesticide | Amount of pesticide | |
|---|---|---|
| | Range (ppm) | Average (ppm) |
| $\gamma$-BHC | 0–22.3 | 0.96 |
| DLD | 0–15 | 2.27 |
| END | 0–2.26 | 0.24 |
| o,p-DDT | 0–5.07 | 0.57 |
| p,p'-DDT | 0–13 | 1.14 |
| DZN | 0–21 | 17.64 |
| DCP | 0–2.24 | 1.25 |
| BPE | 0–2.39 | 1.33 |
| $\alpha$-CVP | 0–7.89 | 3.65 |
| $\beta$-CVP | 0–8.97 | 4.62 |

The presence of pesticide residues could give rise to serious problems in the use of lanolin with safety. Presently, it is desired to develop methods of removing such pesticide residues.

Although it is ideal to remove all the pesticide residues to levels below detectability, such ideal removal is not required. For example, the standard values given below for edible animal oils and fats such as lard (German regulation values set in 1984) will be referred to as target values (allowable residue values).

| Pesticide | Target value |
|---|---|
| HCB | 0.5 |
| $\alpha,\beta,\delta$-BHC | 0.3 |
| $\gamma$-BHC | 2.0 |
| ALD + DLD | 0.2 |
| DDT + DDE | 3.0 |
| END | 0.2 |
| DZN | 0.3 |
| BPE | 0.05 |
| DCP | 0.10 |
| CVP | 1.0 |

Since no standards are mentioned for DZN, BPE, DCP and CVP in animal oils and fats, corresponding regulation values for foods are given for reference.

However, a very wide variety of pesticides are found to be present in lanolin in very small quantities, and considerable difficulties are expected of the usual refining process if it is employed for removing these pesticides from lanolin and WG which is the material therefor. Moreover, lanolin itself exhibits its inherent properties when in the form of a mixture of the complex composition mentioned above. If the refining process used entails changes in the composition of lanolin, the refined product will invariably exhibit impaired characteristics and become unsuitable for use in cosmetics, pharmaceuticals and the like. Up to date, substantially no measures have been taken for the removal of pesticide residues.

The high-temperature vacuum distillation process and high-temperature steam distillation processes appear useful generally for refining various substances but encounter difficulties when used for removing pesticides from lanolin because the pesticide residues in lanolin generally have a high boiling point and very low vapor pressure and further because organic chlorine compounds are all soluble in fats and have high affinity for lanolin. Additionally, these high-temperature processes rather have the drawback of permitting greatly accelerated degradation and discoloration of lanolin itself.

It appears also feasible to apply the usual solvent extraction process to lanolin, whereas no solvent has been found which is capable of dissolving, extracting and separating off the pesticide residues only without dissolving lanolin.

Although it is known that organic phosphorus compounds are unstable to light and heat and readily undergo hydrolysis in the presence of acids or alkalis, the hydrolysis treatment has the drawback of breaking the ester linkage of lanolin at the same time to inevitably degrade lanolin itself.

It is also known to utilize the adsorption process with activated carbon for removing pesticides, especially organic chlorine pesticides, from aqueous solutions, whereas no effect will be expected of this process if it is applied to lanolin which is a multi-component mixture since activated carbon fails to effect selective adsorption.

Although irrelevant to lanolin, reports have been made to the effect that some pesticides are removable by the hydrogenation process and steam distillation process generally employed for refining and deodorizing edible oils and fats (see "Journal of the Japan Oil Chemists' Society", 23(1), 49-52(1974); J. Amer. Oil. Chem. Soc., 45, 866-869(1968); J. Amer. Oil. Chem. Soc., 46, 482-484(1969); etc.). According to these reports, however, the pesticide removal effect varies considerably with the kind of oils or fats to be treated, while the removable pesticides are limited to a few kinds of pesticides including BHC. Incidentally, edible oils or fats are deodorized by the steam distillation process at a temperature of 200° to 260° C. and at 1 to 30 mmHg over a period of 1 to 5 hours by passing water vapor through the oil or fat in an amount of several % of the oil or fat, but these conditions are very severe to lanolin, cause marked discoloration of the product and seriously impair the commercial value thereof. The principle of steam distillation is that when the sum of partial vapor pressures of substances present has reached 760 mmHg, the substance to be removed evaporates at a temperature lower than its inherent boiling point. Accordingly, the evaporation of the contemplated substance is greatly affected by the vapor pressures of the other substances conjointly present, which greatly vary the removal effect. If the substance to be removed is present along with other substance which is close thereto in vapor pressure, a sufficient removal effect will not be achieved unless a larger quantity of steam is used than otherwise. Free alcohols are present in lanolin which are more closer in vapor pressure to pesticides than the main component esters thereof, so that the process, when applied to lanolin, encounters difficulty in fully removing the pesticides unless a considerably large quantity of steam is released. In this respect, the process appears infeasible.

On the other hand, a process has been proposed for preparing hypo-allergenic lanolin by reducing the free fatty alcohol content of common lanolin to less than 2.5% by vacuum distillation, followed by a treatment with activated clay and subsequent filtration to lower the content of scouring agent to less than 0.05% (see Examined Japanese Patent Publication SHO 60-14796). This process is intended to remove from lanolin allergens which are of course different from pesticide residues. The main component esters of lanolin do not evaporate under the temperature condition of this process but are collected as a residue and therefore undergo marked degradation such as discoloration due to a high temperature. Moreover, the removal of free alcohols by the process results in the disadvantage of giving a lower water uptake (W/U) to the product lanolin. The water uptake is an index indicating the hydrophilic property of lanolin. When having a high water uptake, lanolin is uniformly miscible with water, forming a stable water-in-oil emulsion containing a large quantity of water. Thus, the water uptake is one of the important characteristics of lanolin for use in cosmetics and the like.

In brief, since a wide variety of pesticides remain in very small quantities in lanolin or the like which exhibits its original properties when in the form of a mixture of complex composition, it has been extremely difficult to remove these pesticide residues from lanolin or the like without altering the composition thereof and further without impairing the characteristics of lanolin suited for use in cosmetics, pharmaceuticals, etc.

An object of the present invention is to provide a novel process for refining lanolins by removing pesticide residues from the lanolin to levels lower than the allowable limits thereof without impairing the original characteristics of the lanolin to ensure improved safety, i.e., to provide a process for preparing highly refined lanolins.

DISCLOSURE OF THE INVENTION

The above object of the present invention is fulfilled by the following process.

The present invention provides a process for refining a lanolin, the lanolin to be refined as a material containing at least one of the pesticides of the group A given below at a concentration not lower than the target value given below, the process being characterized in that the pesticide remaining in the material is removed to a concentration below the target value by subjecting to at least one step selected from among (1) the step of treating the material in a molten state or in an organic solvent in the presence of a hydrogenation catalyst under the conditions of a temperature of 60° to 210° C., a hydrogen pressure of at least 1 atm. and hydrogen consumption of 0.001 to 0.05 wt. % based on the material lanolin, (2) distilling the material in a vacuum at an absolute pressure of $10 \times 10^{-3}$ to $500 \times 10^{-3}$ mmHg at a temperature of 150° to 280° C., and (3) the step of causing the material to be adsorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms.

| Group A | Target value (ppm) |
|---|---|
| HCB | 0.5 |
| $\alpha,\beta,\delta$-BHC | 0.3 |
| $\gamma$-BHC | 2.0 |
| ALD + DLD | 0.2 |
| DDE + DDT | 3.0 |
| END | 0.2 |
| DZN | 0.3 |
| BPE | 0.05 |

| -continued | |
|---|---|
| Group A | Target value (ppm) |
| DCP | 0.10 |
| α, β-CVP | 1.0 |

Quite surprisingly, the process of the present invention, which comprises the foregoing specific steps (1) to (3), ingeniously removes pesticide residues from lanolins without substantially impairing the characteristics suited to the use of the lanolins, affording refined lanolins which are excellent in safety. Further the present process gives an improved water uptake to the lanolins obtained which is one of the important characteristics thereof and affords a lower peroxide value, imparting to the lanolins higher characteristics desired for the use thereof as case may be.

The lanolin to be treated by the process of the invention as a material can be any of those containing at least one of the pesticides of the group A at a concentration of not lower than the target value given above. In addition to lanolin and WG (wood grease) which is the material therefor, these lanolins include various derivatives derived from lanolin, such as hard lanolin obtained by separating lanolin into a solid portion and an upper liquid portion as by the urea-adduct method or solvent fractionation method, liquid lanolin and various esters prepared from lanolin alcohols, lanolin fatty acids and the like.

The present process will be described below in detail stepwise in respect of the steps (1) to (3).

In the step (1) of the present invention, the lanolin to be treated is made into a molten state or a fluid state in an organic solvent by melting the lanolin to a temperature not lower than the melting point thereof or making the lanolin liquid with use of a suitable solvent. The solvent to be used is any one of organic solvents which are stable under the conditions employed for the step (1), especially those in which lanolin is highly soluble. Examples of preferred solvents are hexane, heptane, octane, isooctane and like hydrocarbons, methanol, ethanol, isopropanol, butanol and like alcohols, mixtures of such solvents, etc.

Subsequently, the liquid material prepared is hydrogenated in the presence of a hydrogenation catalyst, at a temperature of 60° to 210° C., at a hydrogen pressure of at least one atm. and with hydrogen consumption of 0.001 to 0.05 wt. % based on the material lanolin. The term "hydrogen consumption" as used herein refers to the amount of hydrogen consumed by the treatment (reaction) of the liquid to be treated (exclusive of the amount of hydrogen consumed by the reduction reaction of peroxides). The hydrogen consumption is calculated from the amount of hydrogen determined from the pressure difference resulting from the reaction of the reaction system, by subtracting from this amount the amount of hydrogen present as dissolved in the reaction system and the amount of hydrogen consumed by the reduction reaction of the peroxide, the latter two amounts being determined by control tests.

The hydrogenation catalyst to be used for the above treatment can be one of those having activity under the treatment conditions. Examples of useful catalysts are Raney nickel, Raney cobalt, Raney copper, such Raney alloys as stabilized, nickel-kieselguhr and like stabilized reduction nickel catalysts, platinum oxide, ruthenium oxide, copper-chromium oxide and like metal oxide catalysts, nickel, platinum, palladium, ruthenium, rhodium, iron, cobalt, chromium, copper and like metal catalysts, etc. Among these, copper-chromium oxide catalyst, stabilized reduction nickel catalyst and Raney nickel are especially desirable. Although these hydrogenation catalysts are used in an amount not limited specifically, it is suitable to use the catalyst in an amount of about 0.01 to about 10 wt. %, preferably about 0.1 to about 5 wt. %, calculated as the metal and based on the material lanolin in the case where the reaction is conducted batchwise in the usual manner.

The contemplated effect of the present invention can be achieved by the present step (1) especially when this step is executed under the above-specified conditions, i.e., at a temperature of 60° to 210° C,, preferably about 100° to about 180° C., at a hydrogen pressure of at least one atm., preferably about 3 to about 13 atm., and with hydrogen consumption of 0.001 to 0.05 wt. %, preferably 0.005 to 0.035 wt. %. However, the treatment fails to remove pesticides effectively when conducted at temperatures below the above range, whereas when carried out at temperatures above the range, the treatment is subject to a greater influence of side reactions, permitting degradation of the material lanolin with discoloration and an unique reduction odor. Thus temperatures outside the range are undesirable. The reaction pressure does not exert a great influence on the treatment and is preferably in the above range. The hydrogen consumption is the most important condition for the present step (1). When consumed in an amount within the above range, hydrogen ingeniously removes the pesticides residues on decomposition while permitting the material lanolin to retain its basic characteristics. Generally, the ratio of lanosterol (L, trimethylsterol having a double bond at the 8- and 9-positions of a steroid skeleton, as well as at the 24- and 25-positions of a side chain, and three methyl groups at each of 4- and 11-positions) to dihydrolanosterol (DL) having the side-chain double bonds of L saturated, i.e., the ratio L/DL, is in the range of about 1 to about 2. It has been found that the treatment of the step (1) gives rise to the reduction reaction of the side-chain double bonds L as a side reaction to form DL, with a tendency toward a lower L/DL ratio. Nevertheless, when hydrogen is consumed in an amount within the above-specified range, the step (1) achieves an L/DL ratio of at least 0.34 and fully removes the pesticides without substantially impairing the characteristics of the lanolin. Incidentally, usual hydrogenated lanolin is prepared by decomposing the ester bonds in lanolin and reducing the resulting fatty acids to alcohols. The amount of hydrogen then consumed is at least 0.6 wt. % based on the lanolin and is much larger than is the case with the present invention. Further the step (1) of the invention, which involves the side reaction to reduce L to DL, is also likely to cause the side reactions of reducing cholesterol to cholestanol and cholest-3,5-diene-7-one to cholest-3,5-diene-7-ol, and peroxide reducing reactions, whereas these reactions cause no substantial change in the characteristics of the treated lanolin under the specified conditions, but the reduction of peroxides rather leads to the advantage of giving a reduced peroxide value to the treated lanolin.

The hydrogenation treatment of the step (1) can be conducted batchwise or continuously in the usual manner. The continuous method can be practiced, for example, by passing hydrogen gas and the liquid material through a suitable column packed with the hydrogenation catalyst, and collecting the treated liquid continuously or intermittently.

The lanolin resulting from the hydrogenation treatment can be used as a product lanolin for various applications. When required, the product can be treated by various known refining methods into a further purified product.

The step (2) of the present invention subjects a lanolin, the material to be treated, to vacuum distillation at a specified temperature and under a specified pressure. The vacuum distillation under the specific conditions achieves the intended object of the present invention. However, if temperature conditions lower than the above range are employed, an insufficient pesticide removal effect will result, whereas temperatures higher than the above range result in marked discoloration, lower the characteristics of the lanolin, especially the water uptake thereof, and invariably reduce the yield of the lanolin. Thus, temperatures outside the range are undesirable. When the pressure is lower, a sufficient pesticide removal effect can be achieved at a lower treatment temperature advantageously, whereas the lower pressure tends to result in an increased equipment cost and decrease the amount of treatment. Excessively high pressures tend to lower the pesticide removal effect.

Insofar as the above-specified conditions are employed, the vacuum distillation of the step (2) of the present invention can be conducted using usual apparatus, for example, a centrifugal high-vacuum distiller, molecular distilling unit of the falling film type or rotary thin film type, etc. To enable any one of these apparatus to fully exhibit its performance, it is desirable to perform a degasifying step prior to distillation. Although it is desirable to remove the pesticide residues only from the lanolin on evaporation by the vacuum distillation step, it is likely that some free alcohols and like components of low boiling point will also evaporate at the same time depending on the kind of material.

Although the temperature condition for the vacuum distillation should be expressed in terms of the temperature of the surface of evaporation, it is generally difficult to measure the temperature of the evaporation surface. According to the present invention, the following temperature is used as the temperature condition according to the type of distilling apparatus used. In the case of the centrifugal high-vacuum distiller (of the heat medium type) wherein a rotary member is heated with a heat medium, the temperature of the heat medium is taken as the distillation temperature. With the centrifugal high-vacuum distiller (of the electric type) wherein the material is heated with the radiation heat of an electric heater installed on the rear side of a rotary member, the temperature reading is likely to vary with the position of the sensor (which is usually disposed at a distance of several millimeters from the rotary member within a space between the rotary member and the electric heater). In this case, aside from the temperature reading, the temperature condition is employed which gives the same pesticide removal effect as is attained by the apparatus of the heat medium type when the other conditions (the kind and feed speed of the material, degree of vacuum, etc.) are the same. The correlation between this temperature condition and the temperature reading on the actual apparatus can be readily established for the apparatus used. In the case of the molecular distilling unit of the rotary thin film type, the temperature measured on the outer side of an evaporation glass plate is taken as the distillation temperature. The heating means for large-sized apparatus for general production purposes are heat media, induction heater, electric heater, etc., and the temperature reading somewhat differs with apparatus. In such a case, the temperature achieving the same effect as by the apparatus of the heat medium or electric heating type is determined and taken as the distillation temperature. With the centrifugal apparatus, the film is thin, the retention time (the period of time during which the material is heated at the evaporation surface) is of the order of seconds, and the actual material heating temperature is somewhat lower than the temperature reading. With the rotary thin film type, the film is thick, and the retention time is longer, e.g., several minutes.

In any case, the vacuum distillation step (2) of the present invention removes the pesticides as intended substantially without entailing the degradation of the lanolin.

The pesticide contents of lanolins for use as materials vary widely. For example, $\gamma$-BHC, DLD, DZN, CVP and the like can be present in considerably large quantities. When such a material is treated by the step (2) singly, the pesticides can be removed, but too low a yield or water uptake could result. In this case, it is suitable to perform the step (2) in combination with the foregoing step (1) or with the step (3) to be described below.

In the step (3) of the present invention, a material lanolin is brought into contact with a resin about 10 to about 250 angstroms in pore size and selected from among a resin having a skeleton of styrene-divinyl benzene, resin having a skeleton of acrylic ester and polystyrene resin, or with crystalline aluminosilicate about 9 to about 13 angstroms in void size, whereby the pesticide residues in the material lanolin are selectively adsorbed by the resin or the silicate for removal.

We have conducted intensive research on various adsorbents and the like and found that pesticide residues can be selectively removed from lanolins without substantially altering the characteristics thereof with use of the above-specified three kinds of resins and crystalline aluminosilicate although the average pore size thereof is considerably larger than the diameter of molecules of the pesticides and lanolins, assuming that the molecules are spherical. Although the reason why the pesticides are selectively removable using these four kinds of specific adsorbents still remains to be clarified, the principle is considered to be a molecular sieve effect and selective adsorption utilizing the affinity of the adsorbent for the pesticides unlike common adsorption chromatography wherein silica gel or the like is used to utilize the difference in polarity. More specifically, when a sample is passed through a column of gel adsorbent having a swollen three-dimensional reticular structure, the molecules having a specific size penetrate into and diffuse through gel particles, while the molecules larger than the openings of the reticular structure of the gel pass outside the gel, failing to diffuse into the gel. The amount of adsorption of molecules passing through the gel differs with the shape and size of molecules, affinity thereof with the adsorbent, etc. It appears that this difference is utilized for the separation of the pesticide from the lanolins.

Examples of resins having a skeleton of styrenedivinylbenzene for use in the step (3) is Amberlite XAD-2 (90 angstroms in pore size), same XAD-4 (40 angstroms in pore size), same XAD-2000 (45 angstroms in pore size) (all products of Japan Organo Co., Ltd.) and the like. Examples of resins having a skeleton of acrylic ester are Amberlite XAD-7 (90 angstroms in pore size), same XAD-8 (90 angstroms in pore size) (both products of Japan Organo Co., Ltd.) and the like. Examples of polystyrene resins are Amberlite XAD-16 (100 angstroms in pore size, product of Japan Organo Co., Ltd.), Dowex MWA-1 (product of The Dow Chemical Company) and the like. An example of crystalline aluminosilicate is synthetic zeolite.

A more detailed description will be given of the step (3) of the invention wherein the adsorber is used. First, a material lanolin is dissolved in an organic solvent to prepare a solution which is to be treated. The solution is passed through a column packed with the above-specified adsorbent in an amount not exceeding the adsorption capacity of the adsorbent. The organic solvent only is then passed through the column to replace the lanolin remaining in the column by the solvent. The temperature of the column is thereafter raised or a different organic solvent is thereafter passed through the column to desorb the adsorbed pesticides to regenerate the adsorbent. The lanolin resulting from the replacement can be reused as it is as the material solution. Examples of useful solvents are those which exert no adverse influence on the adsorbent and are smaller than lanolins in molecular size and in which lanolins are highly soluble, such as isopropanol, ethanol, methanol, hexane, heptane, benzene, acetone and the like.

The conditions under which the adsorption column is used, such as the solution passing velocity, are those usually employed for columns of this type. The space velocity to be used is about 0.1 to about 10.

Since physical adsorption predominates the adsorption treatment, the lower the temperature, the greater is the amount of adsorption and the better, whereas in this case, there is the disadvantage that the solution to be passed has a lower concentration and requires an increased amount of solvent because lanolins are less soluble. With this considered, it is desired that the treatment temperature condition be usually in the range of room temperature to about 60° C.

The adsorbent can be regenerated by using a different kind of solvent or raising the temperature of the column to thereby desorb the adsorbed pesticides. Although the desorption temperature is limited usually by the boiling point of the solvent used, temperatures higher than the boiling point can be utilized if pressure is applied to the interior of the column. The present step (3) can be performed by preparing a plurality of adsorption columns, using one of them selectively and effecting regeneration by desorption for the other column(s) in the meantime. This method permits a continuous treatment by repeating adsorption and desorption.

Thus, lanolins can be refined by the present step (3) as contemplated.

Our research has revealed that the step (3) is effective not only for WG, lanolin and like esters but also for lanolin alcohols, lanolin fatty acids, etc. which are derived from lanolins, demonstrating that pesticide residues can ingeniously be removed by the step (3) also from these materials without substantially altering the characteristics thereof. The present invention therefore includes the process for treating or refining such lanolin alcohols and lanolin fatty acids.

The present invention further includes a process comprising the steps (1) to (3) in an optional order of combination.

Examples of preferred combinations are the step (1) and the step (2) following the step (1), the step (1) and the step (2) in an optional order, the step (2) and the step (3) in an optional order, and all the steps (1) to (3).

Accordingly, the process of the present invention affords highly refined lanolins which are excellent in safety as desired and satisfactory in quality.

The present invention will be described below in greater detail with reference to examples, in which the following methods were used for determining characteristics values of lanolins and for analyzing and determining pesticides.

Determination of Characteristics Values of Lanolins

GH (Gardner - Holdt):
According to "Standard Methods for the Analysis of Oils, Fats and Derivatives," 2.3 - 1.3 - 71, Gardner Method, established by The Japan Oil Chemists' Society).
MP (melting point):
According to JISC1 (The Japanese Standards of Cosmetic Ingredients) - 44, Rule 2.
DP (dropping point)
According to JISCl-13.
AV (acid value)
According to JISCl-16.
SV (saponification value)
According to JISCl-14 (2.0-g, 4-Hour Method).
OHV (hydroxy value)
According to JISCl-22.
IV (iodine value)
According to JISCl-45 (1.0-g, Hanus Method).
W/U (water uptake)
A sample (10 g) is placed into a mortar, kneaded to the state of an ointment with addition of a small amount of water, and further thoroughly kneaded with addition of water to determine an end point at which water drops remain despite continued kneading. The water uptake is calculated from the following equation.

$$W/U (\%) = \frac{\text{Amount of water added (ml)}}{\text{Weight of sample (g)}} \times 100$$

L/DL ratio
Determined from a gas chromatogram of an unsaponified product of sample.
Hydrogen consumption
According to the method already described.

Method of Analysis and Quantitative Determination of Pesticides (1) Clean up (method a)
A sample (0.5 g) is dissolved in hexane and charged into an activity-adjusted column of Florisil PR (product of Floridin Co.), measuring 20 mm in diameter and 300 mm in length, followed by elution with 300 ml of a mixture of hexane/dichloromethane (80/20) and 300 ml of a mixture of hexane/diethyl ether (85/15). The hexane/dichloromethane fraction (A) and the hexane/diethyl ether fraction (B) are concentrated to 5 ml by using a Kuderna-Danish concentrator.

Clean up (method b)
A sample (1.0 g) is dissolved in 10 ml of dichloromethane, and a 5-ml portion of the solution is charged into a gel chromatogram column prepared by packing Biobeads SX3 (product of Bio-Rad Laboratories) into a glass column, 25 mm in inside diameter and 1000 mm in length, to a height of 780 mm. Dichloromethane is passed through the column at a rate of 4 ml/min for elution, giving an ester fraction, a free alcohol and an organophosphorus pesticide fraction (A), and an organochlorine pesticide fraction (B) in this order. Each of these fractions is concentrated as substituted with hexane using the same concentrator as in the method a.

(2) Method of quantitative determination

The fractions (A) and (B) obtained by the above clean up methods are quantitatively determined by the absolute calibration curve method using GLC-ECD (GC-14A, product of Shimadzu Corporation or #263-30, product of Hitachi Ltd.) or GLC-FPD (#263-50, product of Hitachi Ltd.).

The detection limits (ppm) of quantitative determination for compounds are as follows. Values below these limits are referred to as "not detected (ND)."

| Pesticides | Step (1) | Steps (2), (3) |
|---|---|---|
| $\alpha,\beta,\delta$-BHC | 0.002 | 0.0004 |
| $\gamma$-BHC | 0.002 | 0.0004 |
| HCB | 0.001 | 0.0002 |
| ALD | 0.003 | 0.0005 |
| $\gamma$-CD | 0.004 | 0.0005 |
| DDE | 0.003 | 0.0005 |
| DLD | 0.005 | 0.0006 |
| END | 0.006 | 0.0008 |
| o,p-DDT | 0.01 | 0.001 |
| p,p'-DDT | 0.017 | 0.001 |
| DZN | 0.01 | 0.01 |
| DCP | 0.01 | 0.01 |
| BPE | 0.01 | 0.01 |
| $\alpha$-CVP | 0.01 | 0.01 |
| $\beta$-CVP | 0.01 | 0.01 |

Among the pesticides listed above, those not present in the materials treated in Examples are not always given, and the amount of the compound the isomers of which are not distinguished is the combined amount of the isomers.

Examples 1 to 9 are according to the step (1) of the present invention.

EXAMPLE 1

Wool grease (hereinafter referred to as "WG", 300 g) was refined in the presence of 0.9 g of a stabilized nickel powder catalyst (N103SD, product of Nikki Chemical Co., Ltd.) under the conditions of hydrogen pressure of 3 kg/cm$^2$ G, temperature of 180° C., stirring speed of 900 rpm and reaction time of 4 hours, using a 500-ml autoclave of the vertical type equipped with an electromagnetic stirrer. After the treatment, the catalyst was filtered off.

Table 1 shows the pesticide contents and characteristics of the material WG and the refined product obtained.

TABLE 1

| | Material WG | Treated WG |
|---|---|---|
| Pesticides (ppm) | | |
| DLD | 1.49 | 0.11 |
| $\alpha$-BHC | 0.01 | ND |
| $\beta,\gamma$-BHC | 0.13 | ND |
| DDE | ND | ND |
| DZN | 6.0 | ND |
| Characteristics | | |
| MP (°C.) | 42.8 | 42.5 |
| AV | 3.9 | 8.0 |
| SV | 102 | 97.5 |
| W/U (%) | 200 | 320 |
| GH | 13 | 15 |
| Hydrogen consumption | — | 0.024 |

TABLE 1-continued

| | Material WG | Treated WG |
|---|---|---|
| (wt. %) | | |
| L/DL ratio | — | 0.57 |

EXAMPLE 2

The same refining treatment as in Example 1 was conducted using refined lanolin (hereinafter referred to as "GA") in palace of WG.

Like Table 1, Table 2 below shows the results.

TABLE 2

| | Material GA | Treated GA |
|---|---|---|
| Pesticides (ppm) | | |
| DLD | 2.70 | ND |
| $\alpha$-BHC | 0.05 | ND |
| $\beta,\gamma$-BHC | 0.15 | ND |
| DDE | 0.18 | ND |
| DZN | 1.50 | ND |
| Characteristics | | |
| MP (°C.) | 41.8 | 42.0 |
| AV | 0.5 | 0.7 |
| SV | 101 | 97.8 |
| IV | 28 | 25 |
| W/U (%) | 200 | 290 |
| GH | 8 | 10 |
| Hydrogen consumption (wt. %) | — | 0.029 |
| L/DL ratio | — | 0.6 |

EXAMPLES 3-6

The same refining treatment as in Example 1 was conducted using the same autoclave with the exception of employing the common conditions of 200 g of WG, Raney nickel catalyst (N154D, product of Nikki Chemical Co., Ltd.), 2 g calculated as alloy, stirring speed of 1100 rpm, reaction time of 4 hours, and varying temperatures and hydrogen pressures as listed in Table 3.

Table 3 below shows the different reaction conditions and the pesticide contents and characteristics of the material WG and the refined products obtained.

TABLE 3

| Example No. | 3 | 4 | 5 | 6 |
|---|---|---|---|---|
| Temperature (°C.) | 120 | 120 | 100 | 130 |
| Pressure (kg/cm$^2$) | 40 | 3 | 5 | 5 |
| Hydrogen consumption (wt. %) | 0.008 | 0.007 | 0.007 | 0.009 |

| | Material WG | Treated WG | Treated WG | Treated WG | Treated WG |
|---|---|---|---|---|---|
| Pesticides (ppm) | | | | | |
| DLD | 1.95 | 0.02 | 0.10 | 0.10 | 0.08 |
| ALD | 2.35 | ND | 0.09 | ND | ND |
| END | 0.25 | 0.01 | 0.09 | 0.09 | 0.03 |
| BHC | 1.75 | 0.12 | 0.15 | 0.16 | 0.10 |
| DDT | 1.85 | 0.03 | 0.08 | 0.06 | 0.05 |
| DDE | 0.15 | 0.04 | 0.02 | 0.02 | ND |
| DZN | 1.85 | ND | ND | ND | ND |
| Characteristics | | | | | |
| MP (°C.) | 42.0 | 42.8 | 42.6 | 42.5 | 42.8 |
| IV | 28 | 26 | 27 | 27 | 26 |
| GH | 13 | 13 | 13 | 13 | 14 |

EXAMPLES 7 and 8

The same refining treatment as in Example 1 was conducted using the same autoclave with the exception of employing the conditions of 300 g of GA, 0.9 g of copper-chromium catalyst powder (N203SD, product of Nikki Chemical Co., Ltd.), hydrogen pressure of 3 kg/cm² G, stirring speed of 900 rpm and reaction time of 3 hours at 180° C. (Example 7) or 160° C. (Example 8). Like Table 1, Table 4 shows the results.

TABLE 4

| Example No. | 7 | 8 |
|---|---|---|
| | Material GA | Treated GA | Treated GA |
| Pesticides (ppm) | | | |
| DLD | 0.95 | ND | ND |
| ALD | ND | ND | ND |
| END | 0.06 | ND | 0.02 |
| BHC | 0.20 | 0.01 | 0.05 |
| DDT | 0.20 | ND | 0.05 |
| DDE | 0.07 | 0.03 | 0.05 |
| DZN | 15.0 | ND | ND |
| Characteristics | | | |
| MP (°C.) | 43.0 | 42.9 | 42.5 |
| GH | 8 | 11 | 10 |
| Hydrogen consumption (wt. %) | | 0.012 | 0.013 |
| L/DL ratio | | 0.9 | 0.8 |

EXAMPLE 9

The same refining treatment as in Example 1 was conducted using the same autoclave with the exception of employing the conditions of 300 g of GA, Raney nickel catalyst (N154D, product of Nikki Chemical Co., Ltd.), 3 g calculated as alloy, hydrogen pressure of 5 kg/cm² G, temperature of 120° C., stirring speed of 1100 rpm and reaction time of 1 hour. Table 5 shows the pesticide contents and characteristics values of the treated GA obtained along with those of the material GA.

TABLE 5

| | Material GA | Treated GA |
|---|---|---|
| Pesticides (ppm) | | |
| DLD | 2.10 | ND |
| ALD | 1.60 | ND |
| END | 1.80 | ND |
| γ-BHC | 2.10 | ND |
| o,p-DDT | 1.90 | 0.09 |
| p,p'-DDT | 3.20 | 0.15 |
| DZN | 10.9 | ND |
| BPE | 4.04 | ND |
| DCP | 4.43 | ND |
| Characteristics | | |
| MP (°C.) | 40.8 | 39.0 |
| AV | 0.5 | 0.6 |
| SV | 99.7 | 98.9 |
| IV | 27.0 | 24.2 |
| OHV | 35.8 | 37.4 |
| POV | 31.5 | 11.4 |
| W/U (%) | 430 | 430 |
| GH | 8 | 8 |
| Hydrogen consumption (wt. %) | | 0.017 |
| L/DL ratio | | 0.92 |

COMPARATIVE EXAMPLE 1

Lanolin (5 kg) was charged into a batchwise deodorizing can (amount of one batch =5 kg, heatable with heat medium oil) manufactured by Yoshio Seisakusho and treated by introducing steam into the can under the conditions of temperature of 220° C. and pressure of 9 to 25 mm Hg (11 mm Hg or 18 mm Hg on the average). The treatment wherein steam was used under the average pressure of 11 mm Hg in an amount of 0.9 wt. % (based on the lanolin) will be referred to as "treatment 1." The treatment with steam under the average pressure of 18 mm Hg in an amount of 2.8 wt. % (based on the lanolin) will be referred to as "treatment 2."

Like Table 1, Table 6 below shows the results obtained.

TABLE 6

| | Material | Treatment 1 | Treatment 2 |
|---|---|---|---|
| Pesticides (ppm) | | | |
| α-BHC | 0.02 | 0.01 | ND |
| γ-BHC | 0.05 | 0.04 | 0.02 |
| p,p'-DDE | 0.11 | 0.07 | 0.07 |
| DLD | 0.64 | 0.64 | 0.37 |
| Characteristics | | | |
| GH | 8 | 12 | 13 |
| Treating time (hr) | 0 | 1 | 3 |

Table 6 reveals that DLD is difficult to remove even when the material is deodorized by 0.9 % and still exhibits a residual ratio of 58% even when about 3% deodorization is achieved over a long period of time, indicating that it is impossible to remove the pesticide to a level below the target value of 0.2 ppm. Even the one-hour treatment discolored the lanolin from 8 to 12 in color and is therefore undesirable.

Examples are given below wherein the step (2) of the present invention was performed.

EXAMPLE 10

Lanolin as a material containing the following pesticides was subjected to vacuum distillation at $60 \times 10^{-3}$ to $70 \times 10^{-3}$ mm Hg at 220° or 270° C. (temperature of heat medium) using a centrifugal molecular distiller (0.1M2, product of ULVAC Corporation). Table 7 shows the results (concentrations of pesticide residues (ppm), yields, characteristics values) achieved at the different temperatures.

TABLE 7

| Treatment temperature | | 220° C. | 270° C. |
|---|---|---|---|
| | Material GA | Treated GA | Treated GA |
| Pesticides (ppm) | | | |
| α-BHC | 0.0384 | 0.0032 | 0.0015 |
| HCB | 0.0099 | 0.0038 | 0.0030 |
| γ-BHC | 22.3140 | 0.7231 | 0.2528 |
| ALD | 0.0143 | 0.0019 | 0.0014 |
| γ-CD | 0.0109 | ND | 0.0006 |
| DDE | 0.0772 | 0.0048 | 0.0021 |
| DLD | 1.0674 | 0.0665 | 0.0260 |
| END | 0.0438 | 0.0126 | 0.0097 |
| o,p-DDT | 0.0101 | 0.0083 | 0.0068 |
| p,p'-DDT | 0.0875 | 0.0302 | 0.0206 |
| DZN | 19.3800 | 0.2900 | 0.1100 |
| DCP | 0.3000 | ND | ND |
| α-CVP | 0.9100 | 0.0200 | ND |
| β-CVP | 1.1700 | 0.0600 | ND |
| BPE | 0.2800 | 0.0400 | ND |
| Yield (%) | — | 98.3 | 90.6 |
| Characteristics | | | |
| GH | 7 | 8 | 8 |
| AV | 0.80 | 0.82 | 0.89 |
| SV | 101.4 | 103.0 | 105.3 |
| OHV | 34.6 | 32.3 | 23.2 |
| MP (°C.) | 42.0 | 42.6 | 42.5 |
| W/U (%) | 310 | 321 | 250 |

The above table reveals that the treatment removed the pesticide residues, fully reducing even the considerably high concentrations of γ-BHC, DLD, DZN and CVP. The distillation temperature of 270° C. achieved a much higher pesticide residue removal effect with the attendant evaporation of free alcohols from lanolin, slight reduction of yield and some variations in the characteristics values, whereas these results do not substantially impair the quality of the product. The W/U value (250%) pose no problem, because the value is above 200% which is required of usual uses. The discoloration due to heating is as slight as an increase of 1 in GH, hence no problem.

EXAMPLE 11

The material GA shown below was degasified at 1 to 1.2 mm Hg at 190° to 210° C. and thereafter distilled at 210° to 220° C. and $55 \times 10^{-3}$ to $100 \times 10^{-3}$ mm Hg, using a molecular distiller of the rotary thin film type (MS-300, product of Shibata Scientific Technology Ltd.).

Table 8 shows the results (concentrations of pesticide residues (ppm), yield, characteristics values).

TABLE 8

|  | Material GA | Treated GA |
|---|---|---|
| Pesticides (ppm) | | |
| α-BHC | ND | ND |
| HCB | 0.0177 | 0.0062 |
| γ-BHC | 0.0079 | 0.0072 |
| ALD | 0.0142 | 0.0008 |
| γ-CD | 0.0065 | 0.0049 |
| DDE | 0.2885 | 0.0039 |
| DLD | 0.0627 | 0.0007 |
| END | 0.0273 | ND |
| o,p-DDT | 0.1075 | ND |
| p,p'-DDT | 1.1671 | ND |
| DZN | 0.0200 | ND |
| DCP | ND | ND |
| α-CVP | 3.3900 | 0.0500 |
| β-CVP | 5.2500 | 0.0800 |
| BPE | ND | ND |
| Fraction % | — | 9.7 |
| Residue % | — | 90.3 |
| Characteristics | | |
| GH | 8 | 10.5 |
| AV | 0.5 | 0.6 |
| SV | 105.4 | 109.8 |
| OHV | 34.7 | 23.4 |
| MP (°C.) | 42.0 | 41.5 |
| W/U (%) | 485 | 430 |

The above table reveals that when GA with relatively low pesticide residue contents is treated, the pesticide residue levels achieved are as low as several ppb. Further if the material GA has a sufficiently high W/U value, the GA retains a considerably high W/U value even if treated at a high temperature which results in a slightly lower yield.

EXAMPLE 12

Lanolin as a material was subjected to vacuum distillation at $60 \times 10^{-3}$ to $70 \times 10^{-3}$ mm Hg at 220° C. (temperature of heat medium) using a centrifugal molecular distiller (0.1M2, product of ULVAC Corporation Ltd.).

Table 9 shows the results (concentrations of pesticide residues (ppm), yield, characteristics values).

TABLE 9

|  | Material GA | Treated GA |
|---|---|---|
| Pesticides (ppm) | | |
| α-BHC | 0.1320 | 0.0043 |
| HCB | 0.0570 | 0.0011 |
| γ-BHC | 19.410 | 0.8689 |
| ALD | 0.1760 | 0.0136 |
| γ-CD | 0.2670 | 0.0354 |
| DDE | 0.3300 | 0.0389 |
| DLD | 1.1380 | 0.1546 |
| END | 0.2520 | 0.0411 |

TABLE 9-continued

|  | Material GA | Treated GA |
|---|---|---|
| o,p-DDT | 0.5860 | 0.1358 |
| p,p'-DDT | 0.8580 | 0.3176 |
| DZN | 11.6280 | 0.2760 |
| DCP | 0.3000 | 0.0100 |
| α-CVP | 0.5500 | ND |
| β-CVP | 0.7020 | 0.0780 |
| BPE | 0.1680 | 0.0120 |
| Yield (%) | — | 96.4 |
| Characteristics | | |
| GH | 7 | 7 |
| AV | 0.8 | 0.8 |
| SV | 102.3 | 104.2 |
| OHV | 34.6 | 32.0 |
| MP (°C.) | 42.2 | 42.0 |
| W/U (%) | 310 | 265 |

The above table reveals that the present process lowered all the pesticide residue contents to below the respective target values, giving a lanolin of good quality with high safety, free from any discoloration due to distillation and almost free from variations in characteristics values.

EXAMPLE 13

The material GA given below was degasified at 1 to 1.2 mm Hg at 185 to 195° C. and thereafter distilled at 185° to 200° C. at $60 \times 10^{-3}$ to $100 \times 10^{-3}$ mm Hg using a molecular distiller of the rotary thin film type (MS-300, product of Shibata Scientific Technology Ltd.).

Table 10 shows the results (pesticide residue concentrations (ppm), yield, characteristics values) in the column of distillation A.

The same material as above was degasified at 1 to 1.2 mm Hg at 245° to 255° C. and thereafter distilled at 245° to 255° C. at $300 \times 10^{-3}$ to $450 \times 10^{-3}$ mm Hg.

Table 10, the column of distillation B shows the results (pesticide residue concentrations (ppm), yield, characteristics values).

TABLE 10

|  | Material GA | Distillation A | Distillation B |
|---|---|---|---|
| Pesticides (ppm) | | | |
| α-BHC | 1.0105 | 0.0646 | ND |
| HCB | 0.5300 | 0.0300 | ND |
| γ-BHC | 18.1300 | 1.0959 | 0.0023 |
| ALD | 1.6652 | 0.0854 | ND |
| γ-CD | 2.6028 | 0.0891 | ND |
| DDE | 3.3000 | 0.0809 | 0.0022 |
| DLD | 3.6440 | 0.1426 | 0.0018 |
| END | 2.2580 | 0.0967 | 0.0201 |
| o,p-DDT | 5.0710 | 0.1777 | ND |
| p,p'-DDT | 6.2510 | 0.2100 | 0.0308 |
| DZN | 5.4520 | 0.1180 | 0.0200 |
| DCP | 2.3050 | 0.0630 | ND |
| α-CVP | 0.8900 | ND | ND |
| β-CVP | 1.2900 | ND | ND |
| BPE | 2.3900 | 0.0400 | ND |
| Yield (%) | — | 90.7 | 65.9 |
| Characteristics | | | |
| GH | 8 | 8 | 15 |
| AV | 0.72 | 0.88 | 0.95 |
| SV | 101.4 | 109.2 | 110.0 |
| OHV | 34.6 | 33.1 | 28.7 |
| MP (°C.) | 42.2 | 42.2 | 42.0 |
| W/U (%) | 320 | 275 | 235 |

Table 1 reveals that distillation A achieved approximately the same yield (90.7%) as like distillation process wherein a centrifugal distiller was used, at a distillation temperature of 185° to 195° C. which was about 80° C.

lower than that of the process. Moreover, both the products GA were less than the target values in the respective pesticide residues concentrations, free from discoloration and also free of problems in the characteristics values of lanolin.

Distillation B gave increased amounts of evaporated components and reduced the pesticide residue concentrations almost to the order of ppb due to the higher temperature. Although the treated lanolin was slightly discolored, the color is improved to GH = 8.5 when the lanolin is decolorized by oxidation at 80 to 90° C. with addition of 8 parts of 35% aqueous solution of hydrogen peroxide to give lanolin of good quality.

Examples are given below wherein the step (3) of the present invention was performed.

EXAMPLE 14

A 82.9 g quantity of Amberlite XAD-2 (product of Japan Organo Co., Ltd.), washed and swollen with isopropanol (IPA), was packed in a jacketed column having 20 mm in inside diameter. Hot water having a temperature of 50° C. was circulated through the jacket. Fifty % (W/W) IPA solution of lanolin A as a material was passed through the column and thereafter concentrated to obtain 88.9 g of treated lanolin. Table 11 below shows the pesticide residue contents of the lanolin determined.

The column used for the above procedure was washed with hot IPA for regeneration and reused as regenerated for the same treatment as above. Table 11 also shows the results achieved. The pesticides which were not detectable in the material lanolin were not listed.

TABLE 11

|  | Material A | Treated lanolin | Treated lanolin (reused) |
|---|---|---|---|
| Pesticides (ppm) |  |  |  |
| HCB | 0.002 | 0.0005 | 0.0006 |
| BHC | 0.006 | 0.0015 | 0.0016 |
| ALD | 0.002 | 0.0005 | 0.0008 |
| DDE | 0.009 | 0.0007 | 0.0006 |
| DLD | 0.012 | 0.0052 | 0.0054 |

Table 11 reveals that the present step (3) achieved the pesticide residue reduction effect even if the material used has a residue concentration in the order of ppb. This indicates that the step (3), when in combination with the step (1) or (2), provides a process which is capable of achieving a more excellent effect to refine lanolins.

It is also seen that the resin, even when used again, achieves approximately the same result as attained by the first use in respect of pesticide removal efficiency, removal level and yield.

EXAMPLE 15

Lanolin B containing the pesticides listed below was treated in the same manner as in Example 14 using 51.2 g of Dowex XAD-2, whereby treated lanolin was obtained in an amount of 22 wt. % of the resin.

Table 12 shows the pesticide contents of the resulting lanolin.

TABLE 12

|  | Material lanolin B | Treated lanolin |
|---|---|---|
| Pesticides (ppm) |  |  |

TABLE 12-continued

|  | Material lanolin B | Treated lanolin |
|---|---|---|
| BHC | 4.7223 | 0.8439 |
| ALD | 0.0146 | 0.0008 |
| DDE | 0.0507 | 0.0058 |
| DLD | 0.3396 | 0.0789 |
| END | 0.0224 | 0.0041 |
| o,p-DDT | 0.0400 | 0.0036 |
| p,p'-DDT | 0.2128 | 0.0394 |
| DZN | 1.2100 | 0.28 |
| DCP | 0.9091 | 0.09 |
| α-CVP | 0.6800 | 0.1750 |
| β-CVP | 0.9900 | 0.1860 |
| BPE | 0.3780 | 0.048 |

EXAMPLE 16

Treated lanolins were obtained in the same manner as in Example 14 with the exception of using 50% IPA solution of lanolin alcohol as a material in place of the 50% IPA solution of lanolin and further using 50.0 g of one of Amberlite XAD-2, same XAD-8 and MWA-1.

The result achieved with use of Amberlite XAD-2 (amount of solution passed through the column was 35.8 g). is listed as (1), that achieved by Amberlite XAD-8 (like amount of solution, 22.0 g) as (2), and that achieved by MWA-1 (amount of solution, 15.0 g) as (3) as seen in Table 13.

TABLE 13

| Resin used | Material | Treated lanolin alcohol | | |
|---|---|---|---|---|
|  |  | (1) | (2) | (3) |
| Pesticides (ppm) |  |  |  |  |
| α-BHC | 0.4500 | ND | ND | ND |
| HCB | 0.0056 | 0.0015 | 0.0010 | 0.0010 |
| γ-BHC | 0.015 | 0.0017 | 0.0009 | 0.0015 |
| ALD | 0.2520 | 0.0270 | 0.0120 | 0.0250 |
| HCE | 0.0129 | 0.0013 | 0.0008 | 0.0065 |
| DDE | 0.8075 | 0.0962 | 0.0430 | 0.2020 |
| DLD | 0.2340 | 0.1794 | 0.0850 | 0.1520 |
| o,p-DDT | 0.04 | ND | ND | ND |
| p,p'-DDT | 0.04 | 0.0150 | 0.0090 | 0.0124 |

Examples of combinations of steps (1) to (3) are given below.

EXAMPLE 17

Lanolin was treated under the following conditions using the same device as in Example 1 to obtain treated lanolin (1).

Material: 300 g of lanolin
Catalyst: Raney nickel catalyst (N154D, product of Nikki Chemical Co., Ltd.), 3.0 g
Temperature: 120° C.
Pressure: Initial hydrogen pressure 10 kg/cm$^2$ G
Stirring speed: 900 rpm
Reaction time: 2 hours
Hydrogen consumption: 0.019

Treated lanolin (1) obtained was subsequently subjected to vacuum distillation under the following conditions using the same device as in Example 10 to obtain treated lanolin (2).

Temperature of heat medium: 230° C.
Pressure: 9×10$^{-3}$ mm Hg
Yield: 87%
Table 14 shows the results attained.

TABLE 14

|  | Material lanolin | Treated lanolin (1) | Treated lanolin (2) |
|---|---|---|---|
| Pesticides (ppm) |  |  |  |
| α-BHC | 0.0384 | ND | ND |
| HCB | 0.0099 | 0.0037 | ND |
| γ-BHC | 22.314 | 0.2815 | 0.0039 |
| ALD | 0.0143 | 0.0077 | ND |
| γ-CD | 0.0109 | 0.0016 | ND |
| DDE | 0.0772 | 0.0633 | ND |
| DLD | 1.0674 | 0.1627 | 0.0030 |
| END | 0.0438 | 0.0722 | ND |
| o,p-DDT | 0.0101 | ND | ND |
| p,p'-DDT | 0.0875 | 0.0057 | ND |
| DZN | 19.38 | 0.29 | ND |
| DCP | 0.30 | ND | ND |
| α-CVP | 0.91 | 0.18 | ND |
| β-CVP | 1.17 | 0.19 | ND |
| BPE | 0.28 | ND | ND |
| Characteristics |  |  |  |
| GH | 7 | 7 | 7 |
| W/U | 290 | 290 | 250 |
| MP (°C.) | 42.0 | 42.0 | 42.0 |
| AV | 0.5 | 0.6 | 0.5 |

Table 14 shows that the combination of the steps (1) and (2) of the present invention reduces the pesticide residue contents of lanolin to very low levels (of the order of ppb), permitting the treated lanolin to fully retain the characteristics of lanolin without any degradation.

EXAMPLE 18

The same treated lanolin (1) as obtained by the first step (step (1)) of Example 17 was used in the form of 50% hexane solution as a material and treated in the same manner as in Example 14 with the exception of using synthetic zeolite (Molecular Sieves 13X, product of Wako Pure Chemical Industries, Ltd.) in place of Amberlite XAD-2, whereby 10 g of treated lanolin (3) was obtained.

Table 15 shows the results achieved.

TABLE 15

|  | Material lanolin (treated lanolin (1)) | Treated lanolin (3) |
|---|---|---|
| Pesticides (ppm) |  |  |
| γ-BHC | 0.2815 | 0.0026 |
| ALD | 0.0077 | ND |
| γ-CD | 0.0016 | 0.0012 |
| DDE | 0.0633 | 0.0152 |
| DLD | 0.1627 | 0.0820 |
| END | 0.0722 | 0.0260 |
| p,p'-DDT | 0.0057 | 0.0013 |
| DZN | 0.29 | 0.150 |
| α-CVP | 0.18 | 0.10 |
| β-CVP | 0.19 | 0.09 |
| Characteristics |  |  |
| GH | 7 | 7 |
| W/U (%) | 290 | 290 |
| MP (°C.) | 42.0 | 41.5 |
| AV | 0.6 | 0.6 |

What is claimed is:

1. A process for refining a lanolin, the lanolin to be refined as a material containing at least one of the pesticides of the group A given below at a concentration not lower than the target value given below, the process being characterized in that the pesticide remaining in the material is removed to a concentration below said target value by subjecting to at least one step selected from the group consisting of:

(1) the step of treating the material in a molten state or in an organic solvent in the presence of a hydrogenation catalyst under the conditions of a temperature of 60° to 210° C., a hydrogen pressure of at least 1 atm. and hydrogen consumption of 0.001 to 0.05 wt. % based on the material lanolin, (2) the step of distilling the material in a vacuum at an absolute pressure of $10 \times 10^{-3}$ to $500 \times 10^{-3}$ mm Hg at a temperature of 150° to 280° C., and (3) the step of causing the material to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms,

| Group A | Target value (ppm) |
|---|---|
| HCB | 0.5 |
| α,β,δ-BHC | 0.3 |
| γ-BHC | 2.0 |
| ALD + DLD | 0.2 |
| DDE + DDT | 3.0 |
| END | 0.2 |
| DZN | 0.3 |
| BPE | 0.05 |
| DCP | 0.10 |
| α,β-CVP | 1.0 |

2. A process as defined in claim 1 wherein the lanolin containing at least one of the pesticides of the group A set forth in claim 1 at a concentration not lower than the target value is treated in a molten state or in an organic solvent in the presence of a hydrogenation catalyst under the conditions of a temperature of 60° to 210° C., a hydrogen pressure of at least 1 atm. and hydrogen consumption of 0.001 to 0.05 wt. % based on the material lanolin to thereby remove the pesticide remaining in the material to a concentration below the target value.

3. A process as defined in claim 1 wherein the lanolin containing at least one of the pesticides of the group A set forth in claim 1 at a concentration of not lower than the target value is distilled in a vacuum at an absolute pressure of $10 \times 10^{-3}$ to $500 \times 10^{-3}$ mm Hg at a temperature of 150° to 280° C. to thereby remove the pesticide remaining in the material to a concentration below the target value.

4. A process as defined in claim 1 wherein the lanolin containing at least one of the pesticides of the group A set forth in claim 1 at a concentration of not lower than the target value is caused to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms to thereby remove the pesticide remaining in the material to a concentration below the target value.

5. A process as defined in claim 1 wherein the lanolin containing at least one of the pesticides of the group A set forth in claim 1 at a concentration not lower than the target value is (1) treated in a molten state or in an organic solvent in the presence of a hydrogenation catalyst under the conditions of a temperature of 60° to 210° C., a hydrogen pressure of at least 1 atm. and hydrogen consumption of 0.001 to 0.05 wt. % based on the material lanolin, and (2) subsequently distilled in a vacuum at an absolute pressure of $10 \times 10^{-3}$ to $500 \times 10^{-3}$ mm Hg at a temperature of 150° to 280° C. to thereby remove the pesticide remaining in the material to a concentration below the target value.

6. A process as defined in claim 1 wherein the lanolin containing at least one of the pesticides of the group A set forth in claim 1 at a concentration not lower than the target value is (1) treated in a molten state or in an organic solvent in the presence of a hydrogenation catalyst under the conditions of a temperature of 60° to 210° C., a hydrogen pressure of at least 1 atm. and hydrogen consumption of 0.001 to 0.05 wt. % based on the material lanolin, and (3) caused to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms to thereby remove the pesticide remaining in the material to a concentration below the target value.

7. A process as defined in claim 1 wherein the lanolin containing at least one of the pesticides of the group A set forth in claim 1 at a concentration of not lower than the target value is (2) distilled in a vacuum at an absolute pressure to $10 \times 10^{-3}$ to $500 \times 10^{-3}$ mm Hg at a temperature of 150° to 280° C., and (3) caused to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms to thereby remove the pesticide remaining in the material to a concentration below the target value.

8. A process as defined in claim 1 wherein the lanolin is lanolin, wool grease, hard lanolin, liquid lanolin, lanolin alcohol ester or lanolin fatty acid ester.

9. A process as defined in claim 1 wherein the lanolin is a lanolin alcohol or lanolin fatty acid and is caused to be absorbed by a resin having a pore size of about 10 to about 250 angstroms and selected from among a resin having a skeleton of styrene-divinyl benzene, resin having a skeleton of acrylic ester and polyester resin, or by crystalline aluminosilicate having a void size of about 9 to about 13 angstroms to thereby remove the pesticide remaining in the material to a concentration below the target value.

* * * * *